United States Patent [19]
Leheu

[11] 3,937,653

[45] Feb. 10, 1976

[54] DIAGRID FOR SUPPORTING A NUCLEAR REACTOR CORE

[75] Inventor: Jacques Leheu, Le Raincy, France

[73] Assignee: Commissariat a l'Energie Atomique, Paris, France

[22] Filed: Mar. 27, 1973

[21] Appl. No.: 345,473

[30] Foreign Application Priority Data
Apr. 19, 1972   France .................. 72.13789

[52] U.S. Cl. .................. 176/61; 176/65; 176/87
[51] Int. Cl.² .................................. G21C 15/20
[58] Field of Search .................. 176/61, 50, 62–65, 176/87

[56] References Cited
UNITED STATES PATENTS

| | | | |
|---|---|---|---|
| 2,848,404 | 8/1958 | Treshow | 176/64 |
| 3,235,465 | 2/1966 | McDaniel et al. | 176/61 |
| 3,311,540 | 3/1967 | Tower et al. | 176/61 |
| 3,318,776 | 5/1967 | MacPhee | 176/62 |
| 3,398,050 | 8/1968 | Yevick et al. | 176/61 |
| 3,486,973 | 12/1969 | Georges et al. | 176/61 |
| 3,763,886 | 10/1973 | Lambert | 176/61 |
| 3,785,924 | 1/1974 | Notari | 176/61 |

FOREIGN PATENTS OR APPLICATIONS 1,235,225   5/1960   France .................. 176/65

*Primary Examiner*—Harvey E. Behrend
*Attorney, Agent, or Firm*—Cameron, Kerkam, Sutton, Stowell & Stowell

[57] ABSTRACT

A diagrid for supporting a reactor core having a vertical axis is constituted by a box structure consisting of a flat and horizontal upper plate and a domical lower plate. The upper plate has a circular flange parallel to a peripheral rim of the lower domical plate, the rim and the flange being braced relative to each other. The flange of the upper plate rests on a ring-girder which surrounds the box structure and provides a peripheral side restraint whilst the flat rim of the lower domical plate rests on a flat circular flange of a support which forms a conical downward extension of the domical plate and is rigidly fixed to the reactor vessel.

5 Claims, 2 Drawing Figures

DIAGRID FOR SUPPORTING A NUCLEAR REACTOR CORE

This invention relates to a diagrid for supporting the core of a nuclear reactor of any type but especially a liquid-sodium cooled fast reactor, the heat generated by the reactor core being recovered in separate heat exchangers which are preferably mounted within the vessel which contains the reactor core and the circulating sodium, the reactor core and heat exchangers being thus incorporated in a so-called integrated structure.

The aim of the invention is to endow the coresupport diagrid within the reactor vessel with high mechanical strength, especially with respect to the loads to be carried, while making it possible in particular and especially in the event of accident or of damage to any of its elements to disassemble said diagrid as a single unit, to withdraw the diagrid from the reactor vessel and to replace it by another diagrid of identical design.

More precisely, the invention relates to a reactor diagrid of the above-mentioned type constituted by a box structure having end-walls formed by two metallic plates braced by hollow cylindrical support columns which are suitably disposed at intervals within the box structure on a well-defined and uniform pitch. The open ends of said hollow support columns extend through apertures formed in the upper end-wall of the box structure for positioning and supplying liquid sodium to the fuel assemblies which are supported by the diagrid and the arrangement of which in combination forms the reactor core.

Finally, the invention is even more specifically concerned with a diagrid of this type comprising a horizontally extending flat upper plate and the axis of the reactor core being vertical, and means whereby the box structure formed by the two braced plates is applied against a support forming part of the vessel which contains the reactor core and the heat exchangers.

In accordance with the invention, the diagrid under consideration is characterized in that the lower end plate of the box structure has the shape of a spherical segment or dome which terminates at its periphery in a flat rim and that the upper flat end plate has a circular flange which is parallel to the peripheral rim of the lower plate, said rim and said flange being braced with respect to each other, the flange of the upper end plate being capable of resting on a ring-girder which provides the box structure with a peripheral side restraint and the flat rim of the lower end plate being supported by a flat circular flange formed on a shell element which is rigidly fixed to the reactor vessel.

Apart from this main characteristic feature, a reactor diagrid as constructed in accordance with the invention has further accessory features which are preferably to be considered in combination but could be considered separately if necessary and relate in particular to the following points:

The flat rim of the lower end plate and the parallel flange of the upper end plate are braced by small vertical stiffening columns.

The ring-girder is provided with a top horizontal bearing surface of circular shape having substantially the same radius as the flange of the upper end plate, said flange being applied against said bearing surface by means of coaxial circular grooves, the interengagement of which forms a labyrinth seal against the coolant sodium.

Positioning of the flange of the upper end plate with respect to the circular bearing surface of the ring-girder is carried out by means of studs having the shape of sectors which are carried by the flange and engaged in recesses formed in the bearing surface or conversely.

The shell element which is rigidly fixed to the reactor vessel has a conical shape and is placed in the line of extension of the lower domical end plate of the box structure.

A flexible seal is interposed between a shouldered portion of the flat circular flange of the shell element and the flat rim of the lower end plate of the box structure.

The ring-girder is constituted by a hollow metallic torus which is open laterally towards the box structure, said torus being such as to constitute a manifold for supplying the diagrid with the coolant sodium.

Further characteristic features of the support diagrid under consideration will become apparent from the following description of one exemplified embodiment which is given by way of indication without any limitation being implied, reference being made to the accompanying drawings, wherein.

Figure 1:
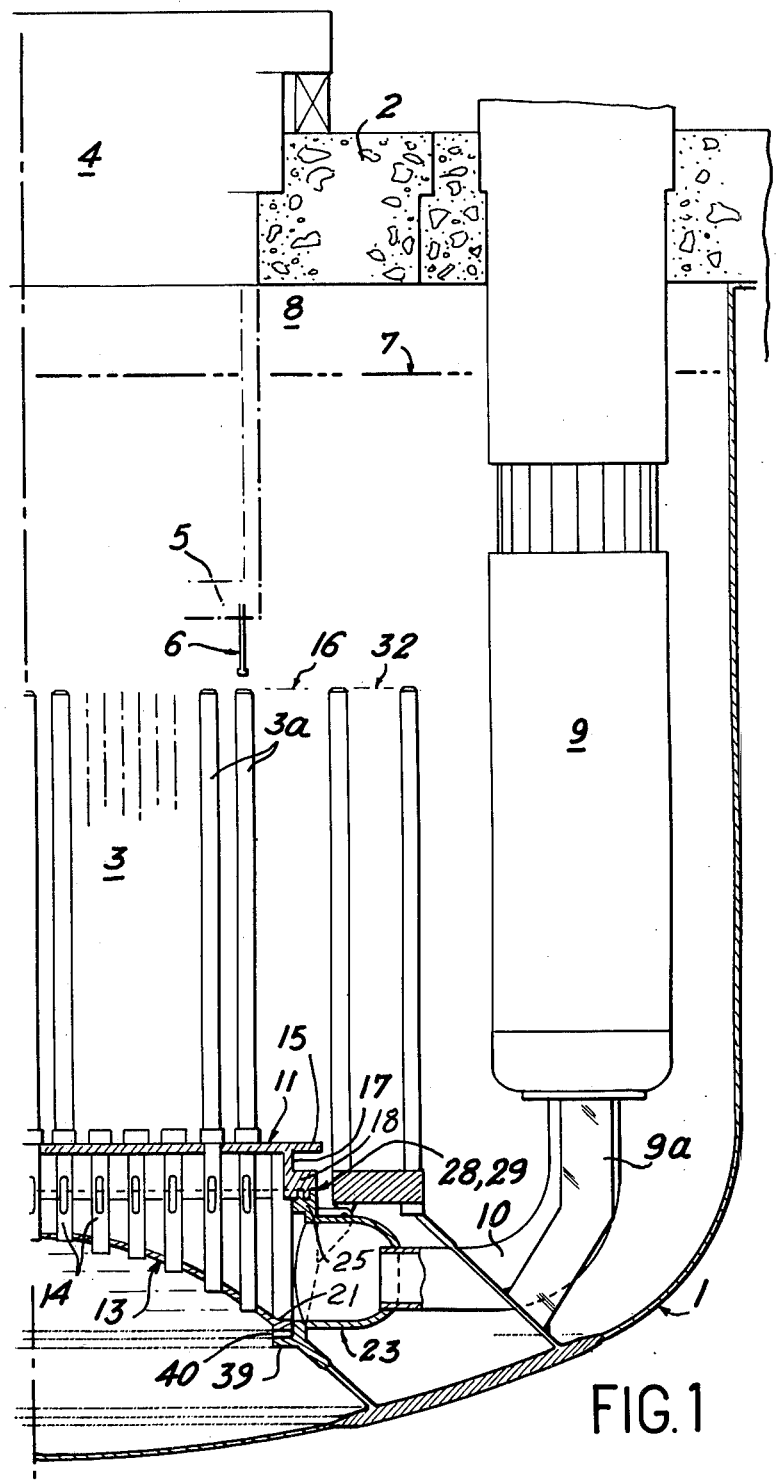
FIG. 1 is a longitudinal half-sectional view of a nuclear reactor which is provided with a diagrid in accordance with the invention.

The reactor which is illustrated in FIG. 1 mainly comprises a metallic outer tank or main vessel which is closed at the top by a slab 2, especially of concrete, which ensures protection against radiations. The reactor core 3 is placed within the vessel 1 and formed by the juxtaposed assembly of fuel elements or assemblies such as those designated by the reference 3a which extend in parallel relation in the vertical direction. Above the reactor core 3, the slab 2 is closed by a rotating seal plug 4 which supports within the vessel 1 above the reactor, a core lid 5 which is fitted with measuring or control devices such as the device 6 for the different core assemblies. The reactor core is immersed in a liquid cooling medium 7 which preferably consists of a flow of liquid sodium, the region 8 which is located above the level of sodium within the reactor vessel being filled with a neutral blanket gas which is usually argon. The circulating sodium which passes through the reactor core 3 becomes heated in contact with the fuel assemblies 3a and returns the heat received into heat-exchanger and circulating-pump units, one of which is represented diagrammatically at 9 in FIG. 1. The units aforesaid are so arranged that the hot sodium discharged from the reactor core is supplied to these latter and, after cooling, is returned beneath said core via ducts such as the duct 10 for a further cycle. Advantageously, the units 9 are uniformly spaced around the vertical axis of the reactor core 3 and are supported at the upper ends thereof by means of the shield slab 2 which serves to gain access to and disassemble said units if necessary; the ducts 10 are in turn supported by means of struts 9a, the lower ends of which are joined to the main vessel 1.

Figure 2:
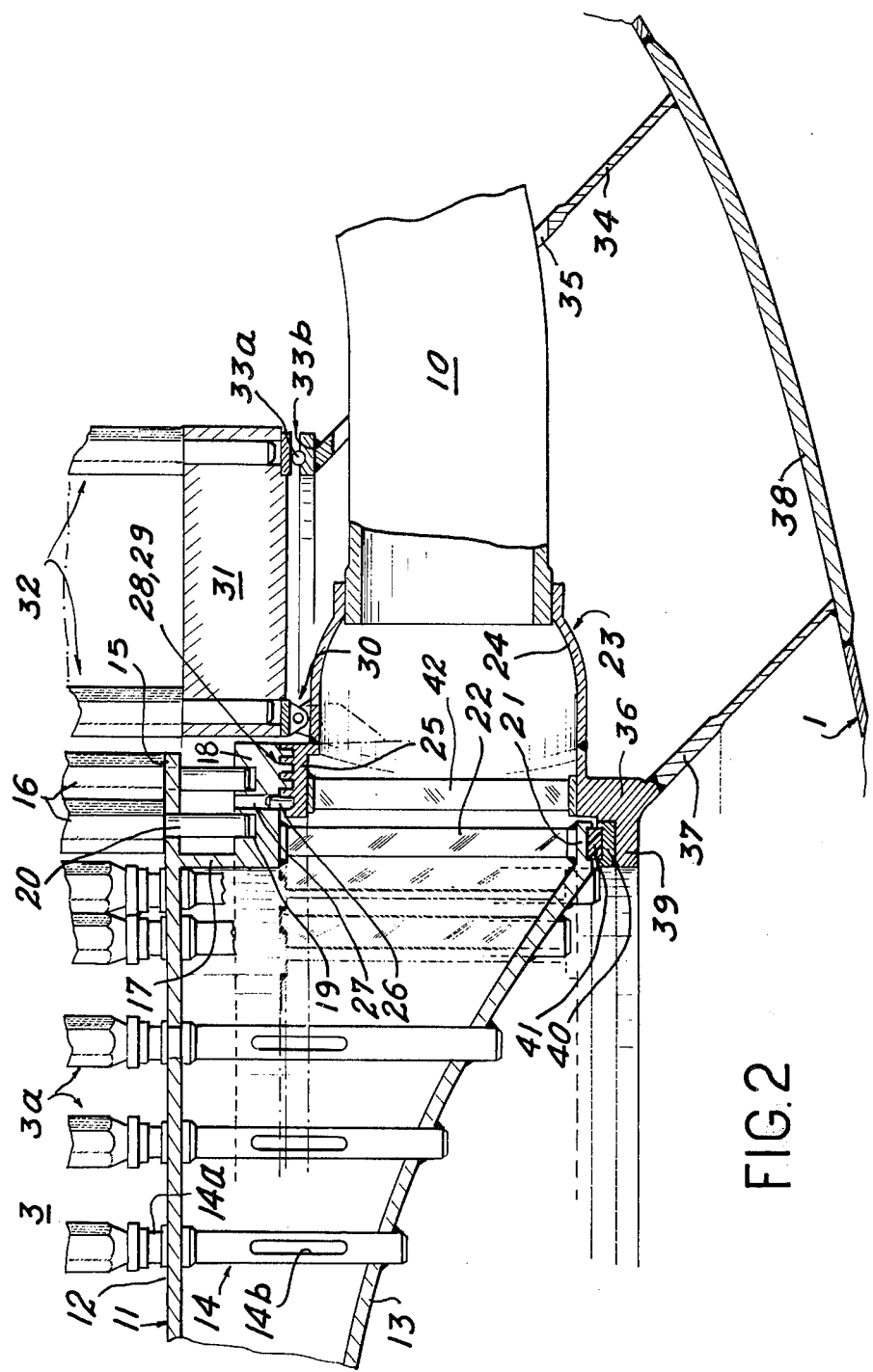
FIG. 2 is also a sectional view but drawn to a larger scale and illustrating the constructional detail of said diagrid and especially the means for supporting this latter on the reactor vessel.

In accordance with the invention, the fuel elements 3a which constitute the reactor core 3 are supported by making use of a diagrid in the form of a box structure, the constructional detail of which is illustrated to a larger scale in FIG. 2. Said box structure is formed in particular of two plates 12 and 13 which constitute the endwalls of the structure, the upper plate 12 being horizontal whilst the lower plate 13 is designed in the form of a spherical segment or dome, the axis of which coincides with the axis of the reactor core. Bracing between the end plates 12 and 13 is carried out by means of hollow cylindrical columns designated by the reference 14 and provided at the upper ends thereof with sleeves 14a which pass through apertures formed in the upper end plate 12. The bottom endfittings of the fuel assemblies 3a are engaged within said sleeves and maintained in a strictly vertical position with a predetermined relative spacing as a result of the pitch on which the support columns are disposed within the box structure 11.

The support columns aforesaid can be secured to the end plates 12 and 13 by any suitable means and especially by means of the so-called electronic beam welding process which provides the welded joints thus formed with a very high degree of mechanical strength. The distribution of the apertures for mounting the support columns 4 on the end plates 12 and 13 must be strictly adapted to the relative positions of the fuel assemblies 3 within the reactor core as mentioned earlier. In consequence, the use of the electronic beam welding process for rigidly fixing the support columns makes it possible in addition to prevent any deformations which might otherwise impair the accuracy of location of these positions. The support columns 14 have a variable length which is suited to the distance between the upper end plate 12 and the lower end plate 13 at each point and are accordingly provided with elongated lateral slots such as the slot 14b. Thus the coolant sodium which flows into the box structure through the ducts 10 from the units 9 is permitted to penetrate into the interior of said support columns and to flow upwards within these latter towards the end-fitting of the corresponding fuel assembly 3a through which the sodium passes while cooling this latter.

In accordance with the invention, the box structure 11 forming the reactor diagrid is supported by the vessel 1 which surrounds the core and contains the coolant sodium by making use of particular means which are placed at the periphery of the structure and which will be described hereinafter.

It is apparent from FIG. 2 that the upper end plate 12 has a flat bearing extension 15 for supporting elements such as those designated by the reference 16 which are usually formed of steel and constitute the lateral neutron-absorbing blanket of the reactor core, said elements being disposed in the vicinity of the fuel assemblies 3a of the core periphery. Beneath the bearing extension 15, the plate 12 is rigidly fixed to a short cylindrical shell 17 terminating at the lower end in a circular flange 18 which extends horizontally, that is to say parallel to the plane of the plate 12. Provision is made at the top of said flange 18 for hollow recesses 19 so as to permit the engagement of positioning rods 20 which are integral with the blanket elements 16.

So far as concerns the lower domical end-plate 13, the outer edge of said plate terminates in a flat rim 21 which extends parallel to the flange 18 of the upper end plate 12. Said flange 18 and said rim 21 are braced with respect to each other by small metallic columns 22, thereby stiffening the entire box structure in conjunction with the columns 14 which are provided for positioning the fuel assemblies 3a. The box structure which is thus formed is accordingly supported by the periphery of the flange 18 on a ring-girder 23 comprising a member 24 having the shape of a half-torus which provides the box structure with a peripheral side restraint; said member 24 is provided with a flat bearing element 25 which extends parallel to the flange 18 in the direction of said box structure and against which said flange is applied. As an advantageous feature, the relative positioning of the box structure 11 with respect to the ring-girder 23 is carried out by means of studs of the type designated by the reference 26 which are rigidly fixed to the bearing element 25 and engaged within hollow recesses 27 formed in the flange. This arrangement is not essential in itself since the studs can conversely be carried by the flange and engage in recesses formed in the ring-girder. Preferably, said studs 26 have the shape of circular sectors and are suitably distributed at the periphery of the bearing element 25 about the common axis of the box structure and of the ring-girder.

Moreover, and in order to ensure suitable leak-tightness with respect to the sodium which is circulated from the ring-girder which forms a manifold and passes through the box structure 11, provision is made at the top portion of the bearing element 25 for a series of raised ribs 28 which engage within circular grooves 29 having the same radius and formed in the opposite face of the flange 18 or conversely. The box structure 11 is thus supported by applying its peripheral flange 18 against the bearing element 25 of the ring-girder 23 which is in turn supported and fixed in position with respect to the main reactor vessel 1. To this end, the toric member 24 is connected by means of a fastening system 30 which is pivotally mounted on an annular member 31 which forms a diagrid extension and surrounds the reactor core externally.

In exactly the same manner as has already been contemplated for the upper plate 12, the diagrid extension aforesaid supports solid elements 32 which are made especially of steel and form a second shield blanket. Said annular diagrid extension 31 is supported by means of rollers 33a on a bearing plate 33b which is in turn carried by webs or support strakes 34 which are joined to the bottom of the reactor vessel 1. These support strakes 34 are provided with passages 35 for the ducts 10 which convey the liquid sodium within the interior of the toric member 24 of the ring-girder 23. In addition, the lower end of the toric member 24 is rigidly fixed to a collar 36 which is welded to a shell element 37 of conical shape. Said element is located substantially in the line of extension of the plane which is tangent to the extremity of the domical end plate 13 and is in turn welded at its opposite extremity to a reinforced portion 38 of the reactor vessel 1.

The flat bearing element 25 and the collar 36 are braced by small vertical columns 42. The collar 36 is provided with a transverse shoulder 39 of flat circular shape which extends horizontally and parallel to the rim 21 of the plate 13; said shoulder 39 carries an annular seating 40 for a flexible seal 41 which is interposed between said seating and the underface of the rim 21.

A supporting diagrid for a nuclear reactor core which is thus provided has many advantages both from the point of view of inherent mechanical strength and in regard to the possibilities of disassembly for repairs or complete replacement. It can in fact be readily understood that the shape adopted for the lower end plate of the box structure, namely a spherical segment which is coaxial with the reactor core, is eminently conducive to rigid positional maintenance of the hollow support columns which carry the fuel assemblies; in addition, this spherical shape has the intrinsic property of providing good mechanical resistance to the loads applied by said fuel assemblies. This arrangement permits in particular a not-negligible reduction in thickness of the plate which constitutes the base of said structure; moreover, the radial cross-sections of the box structure which result from the actual shapes of the upper and lower plates facilitate the practically uniform flow of liquid sodium between the support columns through which the sodium is supplied to the fuel assemblies.

A further advantage of the diagrid under consideration arises from the fact that the box structure bears directly on an annular girder which is connected to the reactor vessel, said girder being so arranged as to constitute at the same time a manifold for the supply of the coolant sodium which is admitted into said diagrid. In particular, this arrangement avoids the need to make provision within the reactor vessel for a flooring slab or element of a similar type which was generally employed in designs of the prior art for supporting the diagrid itself. By virtue of this annular girder which forms a manifold, the supply of sodium is carried out directly and in a uniform manner around the entire box structure whilst simple arrangements (labyrinth seal on the bearing surface proper and annular seal at the lower portion) readily prevent outleakages of sodium from said box structure.

In addition, by making provision on the upper end plate of the box structure for a supporting flange which bears on the ring-girder, the diagrid can readily be freed as a single unit, especially for the purpose of removing the diagrid from the reactor vessel 1, this movement being performed through a passage of suitable diameter formed in the slab 2 after removal of the fuel assemblies 3a. In fact, it is apparent that the diagrid in accordance with the invention is simply laid on the ring-girder and that, by exerting a lifting effort in the upward direction, the diagrid can immediately be separated from its support structures which remain attached to the reactor vessel. Conversely, the rigidity of the diagrid which results from bracing of its end plates on the one hand by means of the support columns and on the other hand by means of the small stiffening columns provided at its periphery is such that said diagrid can be placed on the bearing element of the ring-girder without any attendant danger of variation in the positioning of the support columns and consequently without any deformation of the geometry of the fuel assemblies within the reactor core. Finally, the support columns in turn permit suitable transmission of the loads resulting from said fuel assemblies to the lower domical end plate which in turn transmits loads by means of the annular bearing shoulder to the shell element which is connected to the reactor vessel, all the loads on the diagrid being finally applied to said shell element.

It is readily apparent that the invention is not limited in any sense to the example of construction which has been more especially described with reference to the accompanying drawings but extends to all alternative forms.

What we claim is:

1. A nuclear reactor diagrid combination for supporting the core of a nuclear reactor in which a liquid sodium coolant is circulated within a vessel containing the core and diagrid, said diagrid being constituted by a box structure having end-walls formed by two metallic plates braced by hollow cylindrical support columns which are suitably disposed at intervals within the box structure on a uniform pitch, the upper end plate being flat and horizontal and the axis of the reactor core being vertical, said diagrid being provided with means for applying the box structure against a support which forms part of the reactor vessel, wherein the lower end plate of said box structure has the shape of an upwardly convex spherical segment which terminates at its periphery in a flat rim and wherein the upper flat end plate has a circular flange which is parallel to the peripheral rim of the lower plate, said rim and said flange being braced with respect to each other, the flange of the upper end plate resting on a ring-girder supported by the vessel which provides the box structure with a peripheral side restraint and the flat rim of the lower end plate being supported by a flat circular flange formed on a shell element rigidly fixed to the reactor vessel, wherein the shell element has a conical shape and is in the line of extension of the spherical segment of the lower end plate of the box structure, and wherein the ring-girder is a hollow metallic torus opening laterally toward the box structure, said torus being a manifold for supplying the diagrid with the coolant sodium.

2. A combination in accordance with claim 1, wherein the flat rim of the lower end plate and the parallel flange of the upper end plate are braced by small vertical stiffening columns.

3. A combination in accordance with claim 1 wherein the ring-girder is provided with a top horizontal bearing surface of circular shape having substantially the same radius as the flange of the upper end plate, said flange being applied against said bearing surface by means of coaxial circular grooves, the interengagement of which forms a labyrinth seal against the coolant sodium.

4. A combination in accordance with claim 3, wherein the positioning of the flange of the upper end plate with respect to the circular bearing surface of the ring-girder is carried out by means of studs having the shape of sectors which are carried by the flange and engaged in recesses formed in the bearing surface.

5. A combination in accordance with claim 1, wherein a flexible seal is interposed between a shouldered portion of the flat circular flange of the shell element and the flat rim of the lower end plate of the box structure.

* * * * *